Figure 1:
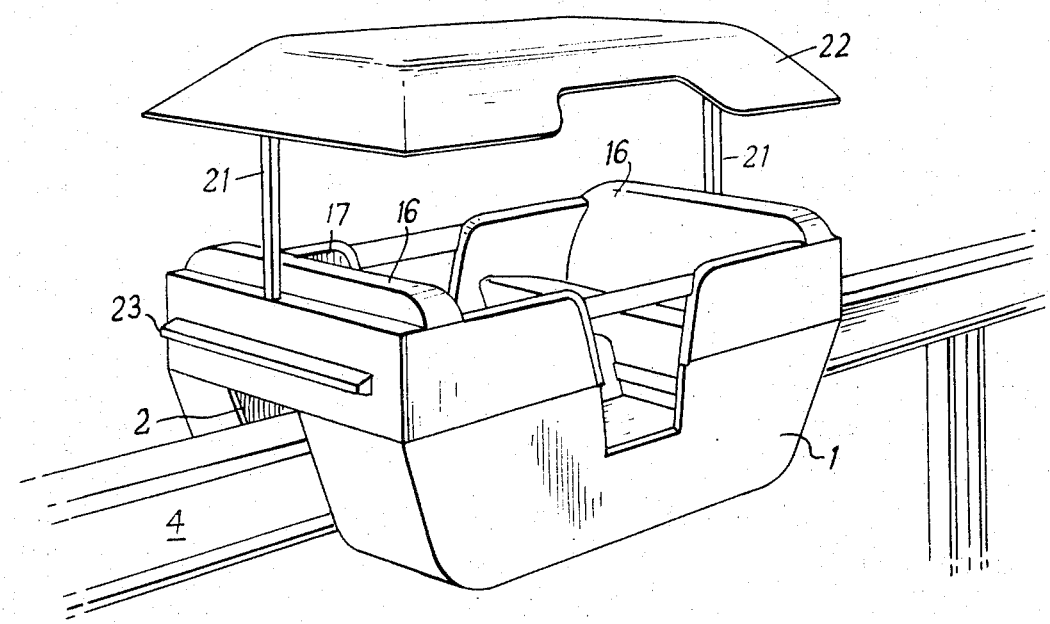

United States Patent [19]
Hill et al.

[11] 3,817,183
[45] June 18, 1974

[54] BATTERY POWERED ELECTRIC MONORAIL CAR AND TRACK SYSTEM

[76] Inventors: Thomas Bernard Hill; Robin Darker Butterell, both of Buchanan House, 24/30, Holborn, London, England

[22] Filed: Oct. 25, 1972

[21] Appl. No.: 300,602

[30] Foreign Application Priority Data
Oct. 26, 1971  Great Britain................... 49744/71

[52] U.S. Cl.................. 104/119, 105/51, 105/145
[51] Int. Cl..... B61b 13/04, B61c 3/02, E01b 25/10
[58] Field of Search....... 105/145; 104/119; 105/50, 105/51, 145

[56] References Cited
UNITED STATES PATENTS
| 552,812 | 1/1896 | Behr | 105/145 X |
|---------|--------|------|-----------|
| 700,609 | 5/1902 | Behr | 105/145 |
| 723,024 | 3/1903 | Rees | 105/145 |

*Primary Examiner*—Lloyd L. King
*Assistant Examiner*—Howard Beltran
*Attorney, Agent, or Firm*—Lawrence Rosen; E. Janet Berry

[57] ABSTRACT

A monorail car has a body for accommodating passengers with a hollow extending along its underside and two wheels one at each end of the car at the upper end of the hollow for engaging a monorail guide member from above. The car can be self-propelled by an electric motor, which drives one of the wheels, and batteries for the motor. The motor and batteries, which constitute a major proportion of the tare weight of the car, and mounted on either side of the wheels in portions of the body extending below the wheels so that the centre of gravity is low and the car has good stability.

4 Claims, 3 Drawing Figures

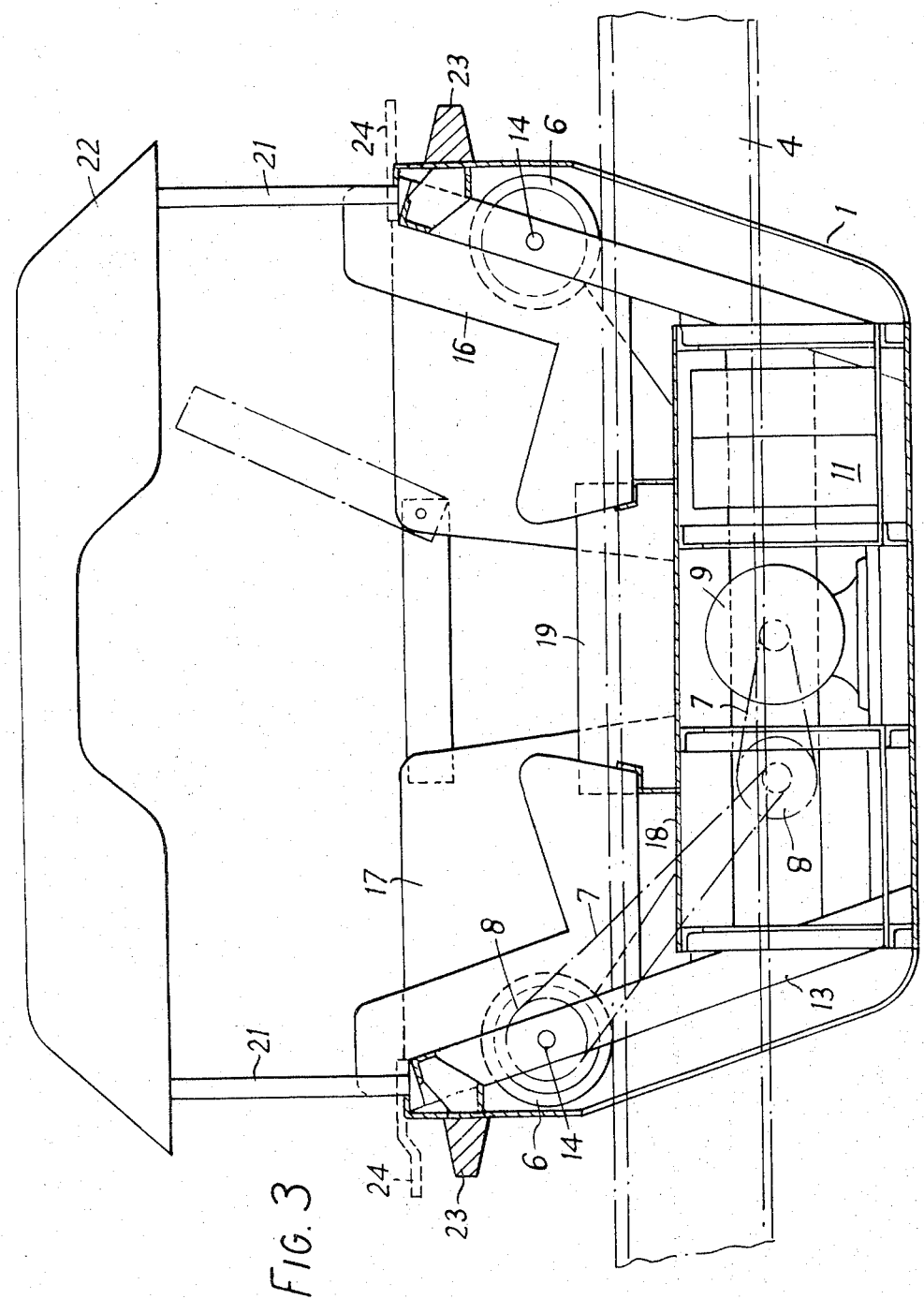

BATTERY POWERED ELECTRIC MONORAIL CAR AND TRACK SYSTEM

The present invention relates to a monorail car and system and in a first aspect provides a monorail car having a wheel for engaging the car guide member from above, the car being self-propelled by a drive of which the motive power apparatus is mounted at least mainly on either side of the wheel and below its guide member engaging surface. Preferably the motive power apparatus comprises an electric motor and batteries, but it is contemplated that other motive power apparatus could be employed, for example an internal combustion engine and fuel tanks therefore.

With this arrangement the weight of the motive power apparatus, which will normally constitute a major proportion of the tare weight of the car, will be below the running surface of the guide member and the portions of the apparatus on one side of the car can counter balance the portions on the other side of the car, providing stability for the car.

The invention also provides a monorail car having a hollow extending along its underside for the passage of the car guide member and a wheel at the upper end of the hollow for engaging from above and running on the guide member with body portions of the car extending downwards on either side of the guide member.

Advantageously, the wheel and guide member are adapted to prevent lateral movement of the car relative to the guide member. In a preferred arrangement, the guide member is a rail and the wheel is doubly flanged and runs on the rail. Alternatively, the guide member could be a channel-section member and the wheel could run in the channel.

Advantageously, the said wheel is a driving wheel coupled to the motor, and the wheel may be mounted substantially half-way between the sides of the car. The guide member can be a single rail or channel section member carried on a beam, and by supporting and driving the car on a wheel engaging the guide member from above, the car can readily be removed from the guide member for example for servicing by simply lifting it off the guide member with a crane or other overhead lifting device.

Figure 2:
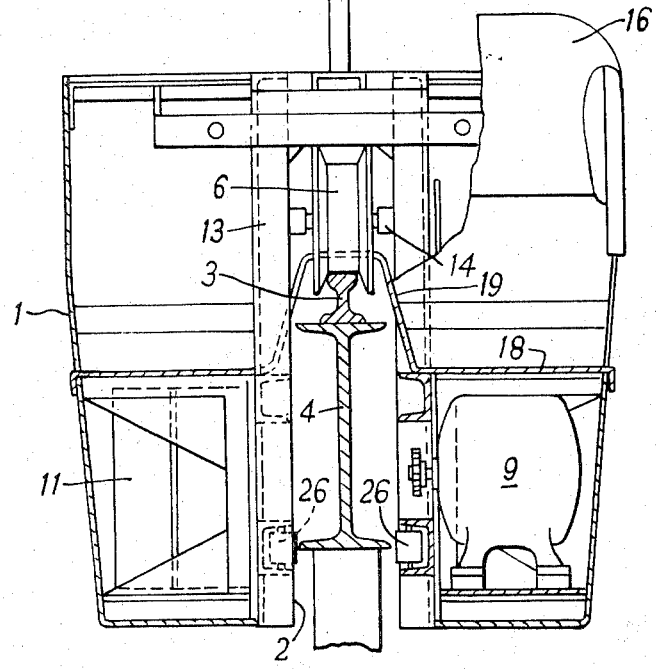

The present invention will now be more fully described by way of example, with reference to the accompanying drawings in which:

FIG. 1 shows in perspective a car according to the invention running on an elevated monorail, and FIGS. 2 and 3 show respectively longitudinal and transverse part sectional views of the car of FIG. 1.

Referring to the drawings, the car comprises a body portion 1 having a hollow 2 extending on the underside through which passes the guide and support rail 3 which is in the form of a standard rail and is mounted on an I-section beam 4.

The car runs on the rail 3 on two rubber tyred doubly flanged wheels 6, one at each end of the car. One of the wheels 6 is a driving wheel and is coupled through belts 7 and pulleys 8 to an electric motor 9 mounted in the body portion 1 below the wheels 6 and on one side of the hollow 2. The motor 9 is powered by batteries 11 mounted in the body portion 1 below the wheels 6 and distributed on either side of the hollow 2 so that the motor 9 and batteries 11 counter balance one another when the car is in use.

The bdoy portion 1 includes a rigid frame 13 which supports the batteries 11, the motor 9, two axles 14 for the wheels 6 and two double seats 16. The passenger compartment 17 is separated from the motor, batteries and the rail 3 by a floor 18 including a tunnel 19.

The upper end of the frame 13 carries support posts 21 for a canopy 22 conveniently a one-piece glass fibre reinforced plastics moulding.

In the form shown in the drawings the body portion 1 has at each end a buffer bar 23 and optionally tow bars 24 shown in broken lines for connecting a number of cars together to form a train.

To avoid frinctional wear between the car and the I-beam 4 and to limit rolling of the car each of the inner sides of the hollow 2 in the car is provided with two longitudinally spaced guide rollers 26 freely rotatable about vertical axes for rubbing engagement with the lower transverse flange of the I-beam 4.

It should be noted that the rollers 26 do not protrude substantially into the hollow 2, so that beneath the wheels 6 there is left a space of which the width does not diminish towards the bottom of the car body 1. This is highly desirable since it allows the car freely to be removed from and replaced on the rail. In some forms, the width of the hollow 2 may increase towards the bottom of the car body, and desirably the width of the hollow throughout its downward extent from below the wheels is as least as great as that of the part immediately below the wheels.

Instead of using a rail of the form shown in the drawings and a doubly-flanged wheel, the guide member could have the form of a channel-section member with a wheel running in the channel.

The I-beam 4 could be replaced by a rectangular section box beam, with the rollers 26 running on the sides of the beam.

In a further form, the wheels 6 run directly on the upper surface of a box-beam which replaces both the I-beam 4 and the rail 3 and the wheels 6 are plain, in the fashion of ordinary road-vehicle wheels. Further rollers, similar to the rollers 26, are provided on the inner sides of the hollow 2 and are spaced above the rollers 26 so that in use they will run on either side of the box-beam at its upper end, adjacent the wheels 6. The further rollers assist the guidance of the car and improve its lateral stability.

In use, an operative at a station along the track may set a car in motion by operating a switch on the outside of the car. Means can be provided for automatically stopping the car's drive when it enters a station.

It is contemplated that a number of cars as described above could be run simultaneously along the rail, and since the cars can be removed from and replaced on the rail by simple vertical movement, could be run on an endless track. Where the cars are run as a train, the towed cars need not have their own motive power apparatus. In order to improve the stability of the towed cars, ballast may be placed in the body portions of the car on either side of the hollow 2, to replace the weight of the motive power apparatus.

Whilst the car described in detail above is intended to carry passengers, it will be appreciated that the monorail car and system of the invention could be made in small-scale form as a toy or small-scale model.

We claim:

1. A monorail system comprising, in combination, a rail, mounted and supported on the upper side of a horizontally-extending beam, the widths of said beam at its upper and lower sides being substantially the same; and a car running on said rail, said car comprising a body having a hollow extending along the undersurface and between the sides thereof, with portions of said body extending downwardly on either side of said beam, means rotatably supporting wheels contacting said rail spaced longitudinally along and at the upper end of said hollow, an electric drive motor and electrical storage batteries connected therewith disposed on either side of said hollow in said downwardly extending portions of said body with the weight of said motor and said batteries counter balancing one another on either side of said hollow, means operatively connecting said motor and at least one of said wheels for driving said car along said rail, and means on each of the two opposing inner sides of said hollow supporting rollers for rotation about vertically extending axes and for rubbing cooperation with said beam, the transverse distance between the surfaces of said rollers being greater than the width of said beam at the region adjacent said rollers, whereby at least one of said two rollers will be spaced from said beam at all times.

2. A monorail system as claimed in claim 1 in which said car has two of said wheels, one adjacent each end of said car.

3. A monorail system comprising, in combination, a rail, mounted and supported on the upper side of a horizontally extending beam, the widths of the said beam at its upper and lower sides being substantially the same; and a car running on said rail said car comprising a body including space for accommodating passengers and having a hollow extending along the undersurface and between the sides thereof, with portions of said body extending downwardly on either side of said beam, means rotatably supporting wheels contacting said rail spaced longitudinally along and at the upper end of said hollow, motive power apparatus including a power supply constituting a major proportion of the unladen weight of said car disposed in substantially equal weights on either side of said hollow in said downwardly extending portions of said body and operatively connected to at least one of said wheels for driving said car along said rail, and means on each of the two opposing inner sides of said hollow supporting rollers for rotation about vertically extending axes and the rubbing cooperation with said beam, the transverse distance between the surfaces of said rollers being greater than the width of said beam at the region adjacent said rollers, whereby at least one of said two rollers will be spaced from said beam at all times.

4. A monorail system as claimed in claim 3 in which said car has two of said wheels, one adjacent each end of said car.

* * * * *